(12) United States Patent
Hwang et al.

(10) Patent No.: US 8,976,477 B1
(45) Date of Patent: Mar. 10, 2015

(54) SYSTEM AND METHOD FOR GENERATING SOFT-ORTHOGONAL SYNCMARKS

(71) Applicant: LSI Corporation, San Jose, CA (US)

(72) Inventors: Eui Seok Hwang, Palo Alto, CA (US); George Mathew, San Jose, CA (US); Xiufeng Song, San Jose, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 14/198,830

(22) Filed: Mar. 6, 2014

Related U.S. Application Data

(60) Provisional application No. 61/938,885, filed on Feb. 12, 2014.

(51) Int. Cl.
*G11B 5/09* (2006.01)

(52) U.S. Cl.
USPC ............ 360/51; 360/31; 360/48; 360/53

(58) Field of Classification Search
None
See application file for complete search history.

(56) References Cited

U.S. PATENT DOCUMENTS

| | | | |
|---|---|---|---|
| 5,148,453 A * | 9/1992 | Newby et al. | 375/368 |
| 5,218,562 A * | 6/1993 | Basehore et al. | 708/422 |
| 5,661,708 A * | 8/1997 | Yamawaki | 369/47.22 |
| 5,901,010 A * | 5/1999 | Glover et al. | 360/78.12 |
| 6,023,386 A * | 2/2000 | Reed et al. | 360/51 |
| 6,275,455 B1 | 8/2001 | Belser | |
| 6,603,622 B1 * | 8/2003 | Christiansen et al. | 360/66 |
| 6,680,807 B1 * | 1/2004 | She et al. | 360/51 |
| 7,193,800 B2 * | 3/2007 | Coker et al. | 360/48 |
| 7,839,591 B1 * | 11/2010 | Weerasooriya et al. | 360/51 |
| 7,881,164 B1 * | 2/2011 | Han et al. | 369/44.11 |
| 8,279,546 B1 * | 10/2012 | Han et al. | 360/51 |
| 8,422,161 B2 | 4/2013 | Cassuto et al. | |
| 8,477,442 B2 | 7/2013 | Albrecht et al. | |
| 8,619,385 B1 * | 12/2013 | Guo et al. | 360/77.08 |
| 8,681,439 B2 * | 3/2014 | Mathew et al. | 360/31 |
| 8,749,908 B2 * | 6/2014 | Xia et al. | 360/51 |
| 2003/0147168 A1 * | 8/2003 | Galbraith et al. | 360/53 |
| 2008/0180826 A1 | 7/2008 | Cho | |

\* cited by examiner

*Primary Examiner* — Dismery Mercedes
(74) *Attorney, Agent, or Firm* — Suiter Swantz pc llo

(57) ABSTRACT

The disclosure is directed to a system and method of generating soft-orthogonal syncmarks for at least a first set of tracks and a second set of tracks. Random pairs of sync patterns are searched to identify one or more pairs where the sync patterns of each pair exhibit delta-like autocorrelation and small cross-correlation with each other and with preamble portions of the tracks. Then a pair of sync patterns is selected from the one or more identified pairs, where the selected pair includes sync patterns that are distinguishable from the user data portions of the tracks at least partially based upon a data characteristic of the user data portions of the tracks. The selected pair of sync patterns is then used to generate a first syncmark for the first set of tracks and a second syncmark for the second set of tracks.

19 Claims, 7 Drawing Sheets

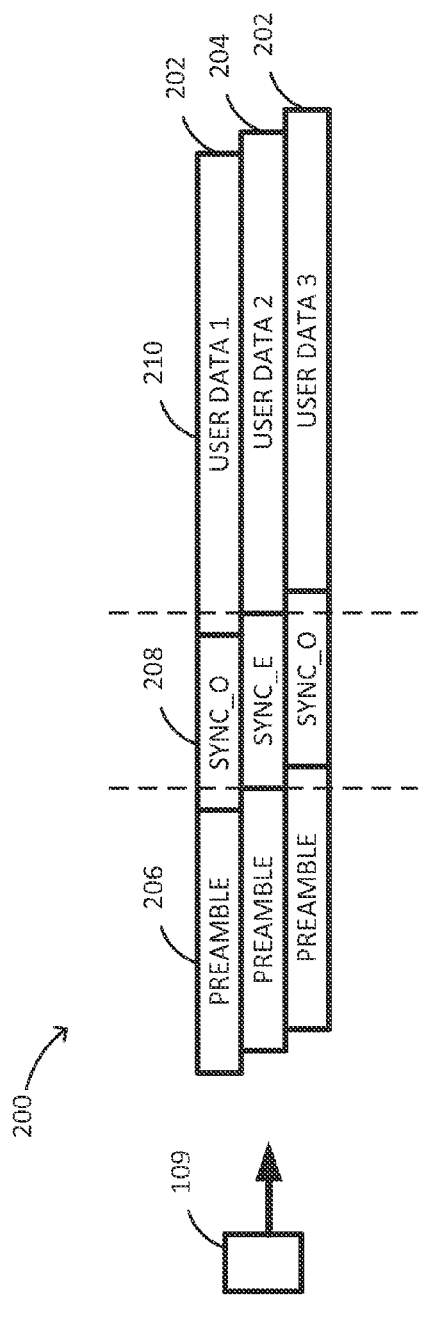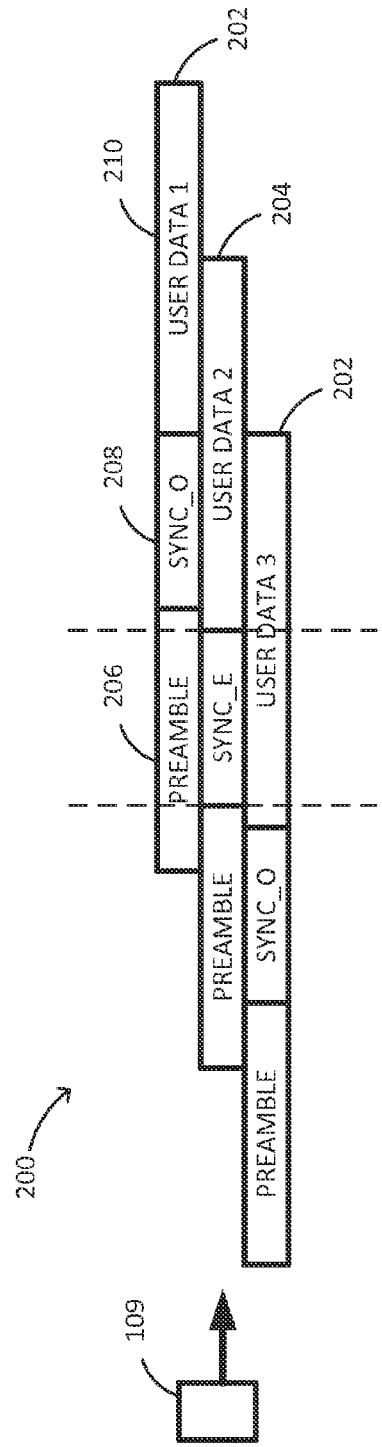

SYSTEM AND METHOD FOR GENERATING SOFT-ORTHOGONAL SYNCMARKS

PRIORITY

The present application claims priority under 35 U.S.C. §119(e) to U.S. Provisional Patent Application Ser. No. 61/938,885, entitled SYSTEM AND METHOD FOR GENERATING SOFT-ORTHOGONAL SYNCMARKS, By Eui Seok Hwang et al., filed Feb. 12, 2014. The above-referenced provisional patent application is hereby incorporated by reference in its entirety.

FIELD OF INVENTION

The disclosure relates to the field of data storage devices and more particularly to data storage devices configured for multi-dimensional recording.

BACKGROUND

More aggressive shingling schemes are being used to increase track density in data storage devices configured for multi-dimensional recording, such as in two-dimensional magnetic recording (TDMR) hard disk drives. As a result, inter-track interference (i.e. interference or noise from neighboring tracks on a disk platter) makes it increasingly difficult to detect syncmarks. A syncmark is a portion of a track that typically separates a track preamble from a user data portion of the track and helps a reader determine where the user data begins. Accordingly, failure to detect the syncmark can result in failure to successfully recover user data of a target track.

SUMMARY

Embodiments of the disclosure include a system and a method for generating soft-orthogonal syncmarks, where soft-orthogonal syncmarks are substantially orthogonal or nearly orthogonal (i.e. exhibit very small or no cross-correlation). The use of orthogonal syncmarks prevents inter-track interference from affecting tracks with small phase offsets. To accommodate larger phase offsets, the syncmarks can be generated with additional constraints so that they are distinguishable from preamble and user data portions of neighboring tracks. In order to do so, small cross-correlation is allowed between a pair of syncmarks, where the pair of syncmarks includes a first syncmark for a first set of tracks and a second syncmark for a second set of tracks, such as a first syncmark for odd-numbered tracks and a second syncmark for even-numbered tracks.

According to various embodiments, a method of generating a pair of syncmarks for a first set of tracks and a second set of tracks includes at least the following steps. Random pairs of sync patterns are searched to identify one or more pairs where a first sync pattern and a second sync pattern of each pair exhibit delta-like autocorrelation and small cross-correlation with each other and with preamble portions of the tracks. The identified pairs of sync patterns are further compared with at least one data characteristic of user data portions of the tracks to select a pair of sync patterns including a first sync pattern and a second sync pattern that are distinguishable from the user data portions of the tracks at least partially based upon the data characteristic. The first sync pattern and the second sync pattern of the selected pair are then used to generate a first syncmark for the first set of tracks and a second syncmark for the second set of tracks.

It is to be understood that both the foregoing general description and the following detailed description are not necessarily restrictive of the disclosure. The accompanying drawings, which are incorporated in and constitute a part of the specification, illustrate embodiments of the disclosure, wherein like numbers represent like characters.

BRIEF DESCRIPTION OF THE DRAWINGS

The embodiments of the disclosure may be better understood by those skilled in the art by reference to the accompanying figures in which:

FIG. 2A is a conceptual illustration of adjacent tracks from a first set of tracks and a second set of tracks, wherein the adjacent tracks have a small phase offset, in accordance with an embodiment of the disclosure;

FIG. 2B is a conceptual illustration of adjacent tracks from a first set of tracks and a second set of tracks, wherein the adjacent tracks have a large phase offset, in accordance with an embodiment of the disclosure;

DETAILED DESCRIPTION

Reference will now be made in detail to the embodiments disclosed, which are illustrated in the accompanying drawings.

FIGS. 1A through 4C illustrate embodiments of a system and method for generating soft-orthogonal syncmarks, where soft-orthogonal syncmarks are defined as being substantially orthogonal or nearly orthogonal (i.e. exhibit very little or no cross-correlation). The use of orthogonal syncmarks prevents inter-track interference from affecting tracks with small phase offsets. To accommodate larger phase offsets, the syncmarks can be generated with additional constraints so that they are distinguishable from preamble and user data portions of neighboring tracks. In order to do so, small cross-correlation is allowed between a pair of syncmarks, where the pair of syncmarks includes a first syncmark for a first set of tracks and a second syncmark for a second set of tracks, such as a first syncmark for odd-numbered tracks and a second syncmark for even-numbered tracks.

Figure 1A:
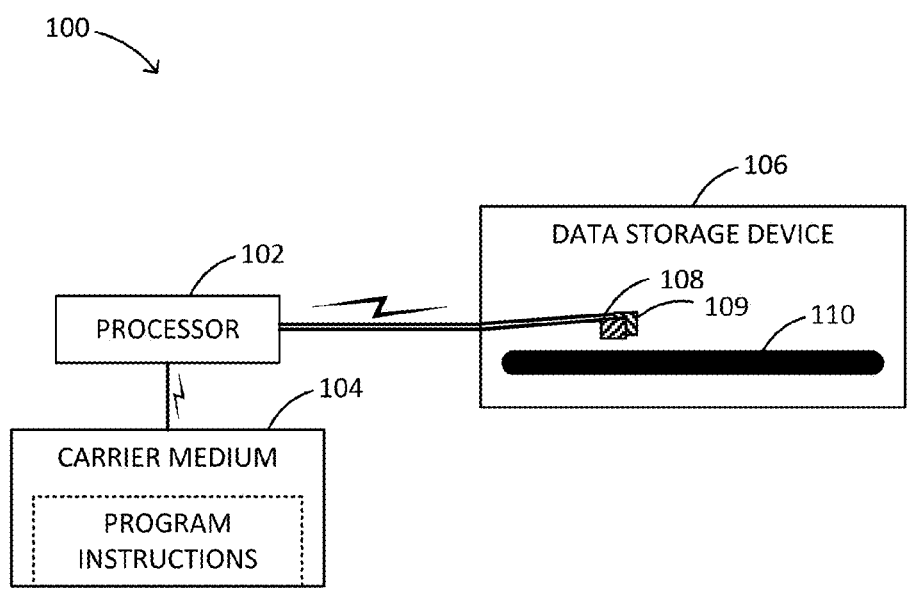
FIG. 1A is a block diagram illustrating a data storage system configured for generating soft-orthogonal syncmarks for a first set of tracks and a second set of tracks being written to a disk platter of at least one data storage device, in accordance with an embodiment of the disclosure.
Figure 1B:
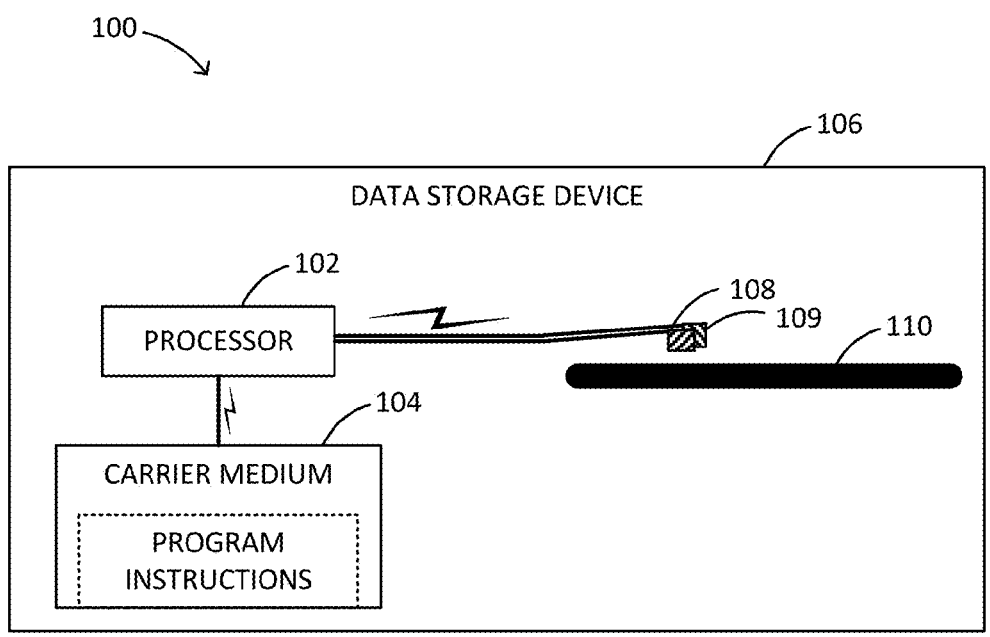
FIG. 1B is a block diagram illustrating a data storage system configured for generating soft-orthogonal syncmarks for a first set of tracks and a second set of tracks being written to a disk platter of at least one data storage device, wherein at least one processor for generating the soft-orthogonal syncmarks is located on or within the data storage device, in accordance with an embodiment of the disclosure.

Looking now to FIG. 1A, an embodiment of a data storage system 100 is shown including a data storage device 106 having at least one recording head 108 and at least one read head 109. In some embodiments, the recording head 108 and the read head 109 are separate assemblies. In other embodiments, the recording head 108 and the read head 109 may be combined, as in magnetic READ/WRITE head assemblies. The recording head 108 is configured to write tracks to a disk platter 110, such as a magnetic disk platter. According to various embodiments, the recording head 108 is configured to write a first set of tracks (e.g. odd-numbered tracks) and a second set of tracks (e.g. even-numbered tracks) to the disk platter 110 using different syncmarks for the different sets of tracks. The system 100 further includes a computing system including at least one processor 102 configured to execute computer-readable program instructions from a non-transitory carrier medium 104. The processor 102 is communicatively coupled to the recording head 108 and is configured to drive the recording head 108 to write tracks of data sequences to the disk platter 110. In some embodiments, as shown in FIG. 1B, the processor 102 or a dedicated controller (e.g. microcontroller, FPGA, PIC, or ASIC) is located on or within a portion of the data storage device 106.

Figure 1C:
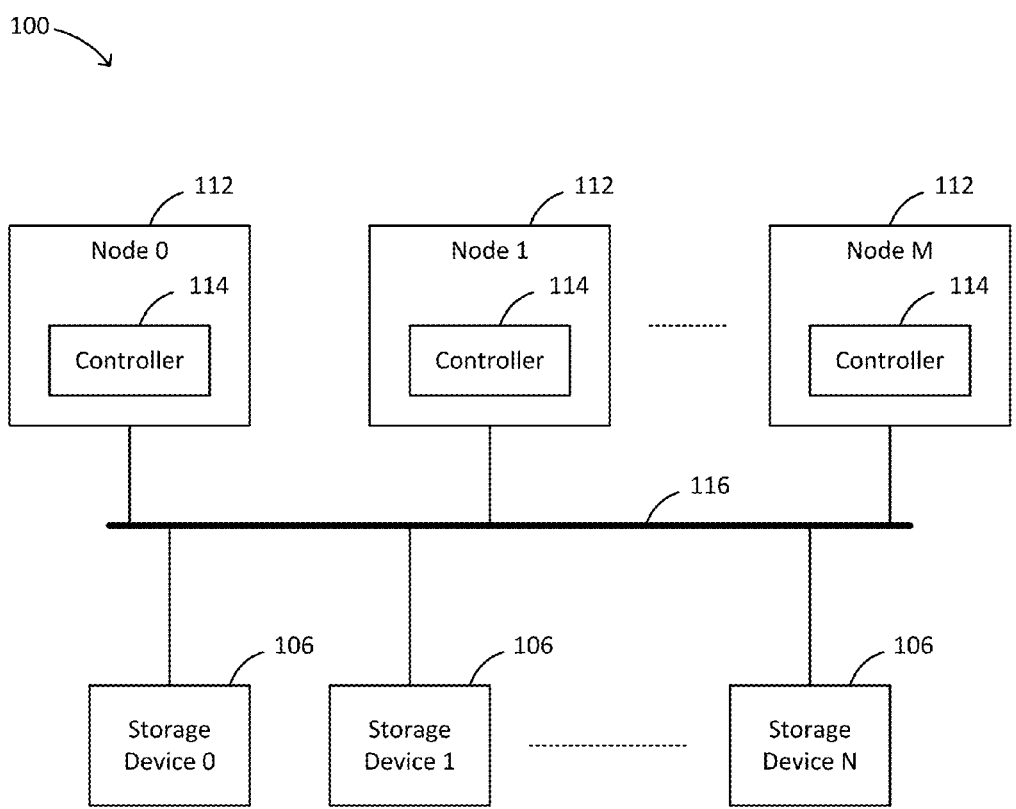
FIG. 1C is a block diagram illustrating a data storage system configured for generating soft-orthogonal syncmarks for a first set of tracks and a second set of tracks being written to a disk platter of at least one data storage device included in a plurality of data storage devices making up a redundant array of independent disks or devices (RAID) storage system, in accordance with an embodiment of the disclosure.

Some data storage systems include a plurality of storage devices storage devices, some or all of which may be configured for multi-dimensional recording. Redundant array of independent disk or device (RAID) configurations can include N storage devices including, but not limited to, hard-disk drives, solid-state drives, or a combination thereof, where N is any number greater than 1. In some embodiments, as shown in FIG. 1C, the data storage system 100 includes a RAID configuration where the N devices making up a storage cluster include one or more data storage devices 106 configured for multi-dimensional recording (as described above). At least one of the N devices may include a data storage device 106 that is coupled with or includes a processor 102 for generating soft-orthogonal syncmarks for tracks written to the disk platter 110 of the data storage device 106. According to the embodiments illustrated by FIG. 1C, the data storage system 100 further includes one or more nodes 112 or servers, each including a respective controller 114. The controller 114 in each of the one or more nodes 112 may include a RAID-on-Chip (ROC) controller, a processor, or any other controller configured to access some or all of the N devices via a network 116, such as one or more switches or expanders, directly or indirectly linking the controller 114 to the one or more storage devices 106.

FIGS. 2A and 2B illustrate a plurality of adjacent tracks 200 stored on the disk platter 110, where the tracks 200 include at least a first set of tracks 202 (e.g. odd-numbered tracks) and a second set of tracks 204 (e.g. even-numbered tracks). Each track 202/204 includes at least a preamble 206, a syncmark 208, and user data 210. In some embodiments, the preamble portion 206 is the same for all of the tracks 200. In other embodiments, each track 202 of the first set of tracks includes a first preamble 206 and each track 204 of the second set of tracks includes a second preamble 206. The first preamble and the second preamble may be orthogonal to further reduce inter-track interference. For example, the preamble portions of the odd tracks may be orthogonal or substantially orthogonal to the preamble portions of the even tracks. Those skilled in the art will appreciate that multiple sets of tracks (i.e. two or more sets) may be shingled according to a multi-dimensional recording configuration. While many of the embodiments illustrated in the figures and described herein are directed to a two-dimensional recording configuration having a first (odd-numbered) set of tracks and a second (even-numbered) set of tracks, it is noted that soft-orthogonal syncmarks can be generated for any multi-dimensional recording configuration. Accordingly, the use of the terms "first" and "second" should be understood to further encompass embodiments including additional elements, such as a "third" element, a "fourth" element, and the like.

As shown in FIGS. 2A and 2B, phase offsets can occur between the adjacent tracks 200, thereby shifting portions of the tracks from an alignment origin. The misalignment and inter-track interference increases difficulty of syncmark detection. Small phase offsets, shown in FIG. 2A, generally affect the alignment between syncmarks 208 of a first track 202 and an adjacent second track 204. By making the syncmarks orthogonal or substantially orthogonal with a selected level of shift tolerance, the inter-track interference at small phase offsets (i.e. small shifts from the alignment origin) does not significantly affect syncmark detection. Because there is little or no cross-correlation between the syncmarks 208 of the adjacent tracks 202 and 204, a reader 109 can determine where a syncmark 208 of a target track (e.g. SYNC_E of track 204) begins and ends based upon a comparison with shifted syncmarks 208 of the neighboring tracks (e.g. SYNC_O of tracks 202). In some embodiments, the reader 109 is substantially as wide as or wider than the track pitch (as shown in FIGS. 2A and 2B). For example, the reader 109 may be approximately 100-150% as wide as the track pitch, thereby allowing for a stronger read-back signal. However, increasing the reader width also increases sensitivity to inter-track interference, and this creates an even greater need for methods of improving syncmark detectability in the presence of phase offsets.

Large phase offsets, shown in FIG. 2B, cannot be resolved by simply making the syncmarks orthogonal to one another because a syncmark 208 of a first track 202 and a syncmark of an adjacent second track 204 may be shifted far out of alignment. In some embodiments, a large phase offset can cause the syncmark 208 of a track (e.g. SYNC_E of track 204) to be shifted into a position where it is substantially adjacent to preamble 206 and user data 210 portions of the neighboring tracks (e.g. PREAMBLE and USER DATA 3 of tracks 202). To accommodate large phase offsets, the reader 109 must further be enabled to distinguish a syncmark 208 of a target track from the preamble 206 and user data 210 portions of neighboring tracks. This can be accomplished by relaxing the constraints on cross-correlation between the syncmarks 208 in order to add constraints for distinguishing the syncmarks 208 from the preamble 206 and user data 210 portions. Even if some cross-correlation is allowed between a first syncmark 208 of a first track 202 and a second syncmark 208 of a second track 204 adjacent to the first track 202, the soft-orthogonal syncmarks 208 will still be easily distinguishable from one another. Importantly, relaxing the constraints on cross-correlation between a pair of syncmarks (i.e. generating a pair of "soft-orthogonal" syncmarks) allows for an increased number of possible sync patterns which can be searched to find a pair satisfying the constraints for generating syncmarks 208 that are distinguishable from the preamble 206 and user data 210 portions of the tracks 200.

Figure 3:
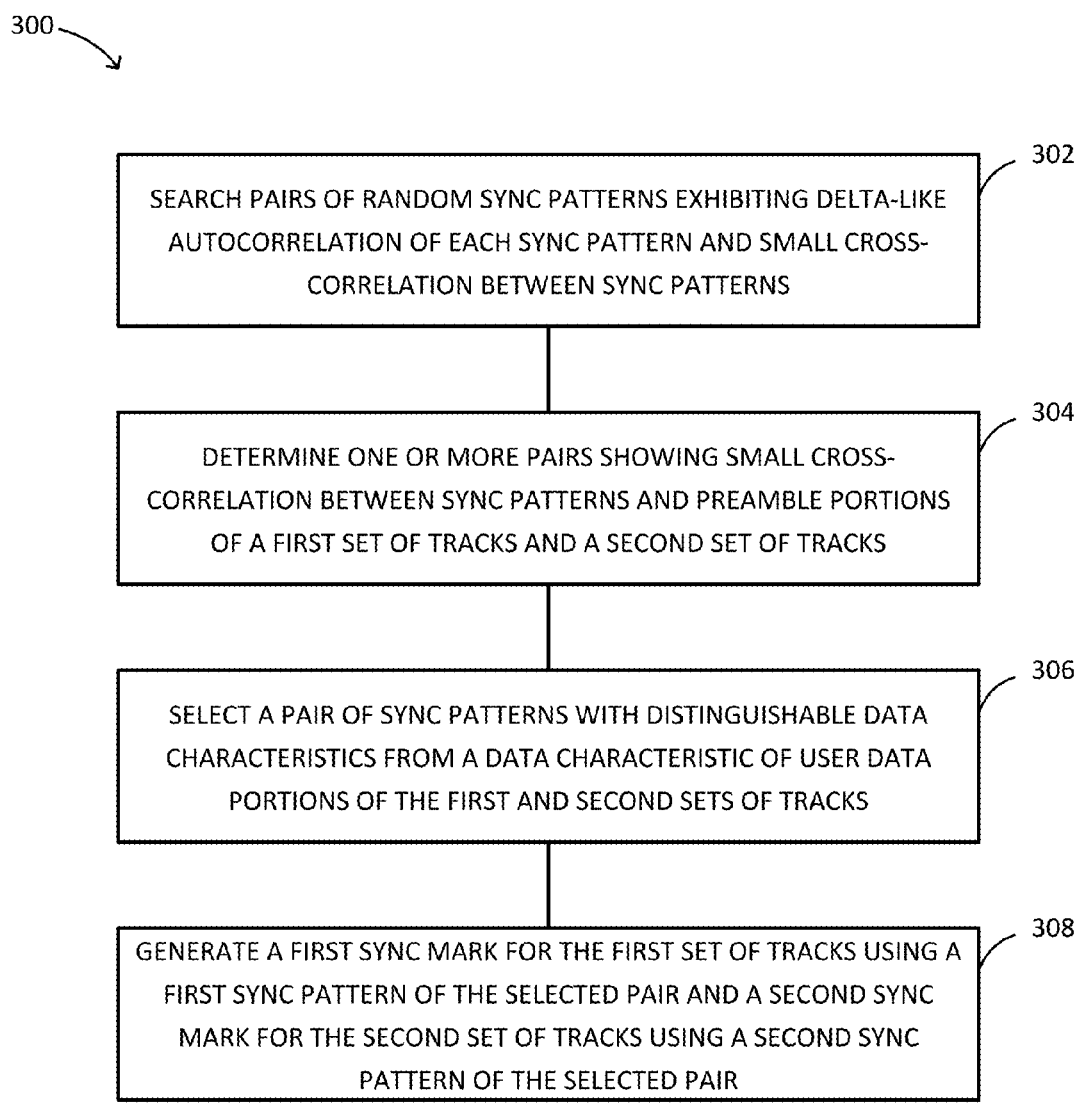
FIG. 3 is a flow diagram illustrating a method for generating soft-orthogonal syncmarks for a first set of tracks and a second set of tracks being written to a disk platter of at least one data storage device, in accordance with an embodiment of the disclosure.

In accordance with the foregoing concepts, FIG. 3 illustrates a method 300 of generating a pair of soft-orthogonal syncmarks 208 including at least a first syncmark (e.g. SYNC_O) for a first set of tracks and a second syncmark (e.g. SYNC_E) for a second set of tracks, where each track 202 of the first set of tracks is adjacent to a track 204 of the second set of tracks. In some embodiments, computer-readable program instructions implementing the steps of method 300 are executed by at least one processor 102 from a communicatively coupled carrier medium 104, as discussed in further detail below. Those skilled in the art will further appreciate that method 300 is not restricted to the embodiments of system 100 described herein and can be embodied by any combination of systems and devices configured to carry out the following steps.

Figure 4A:
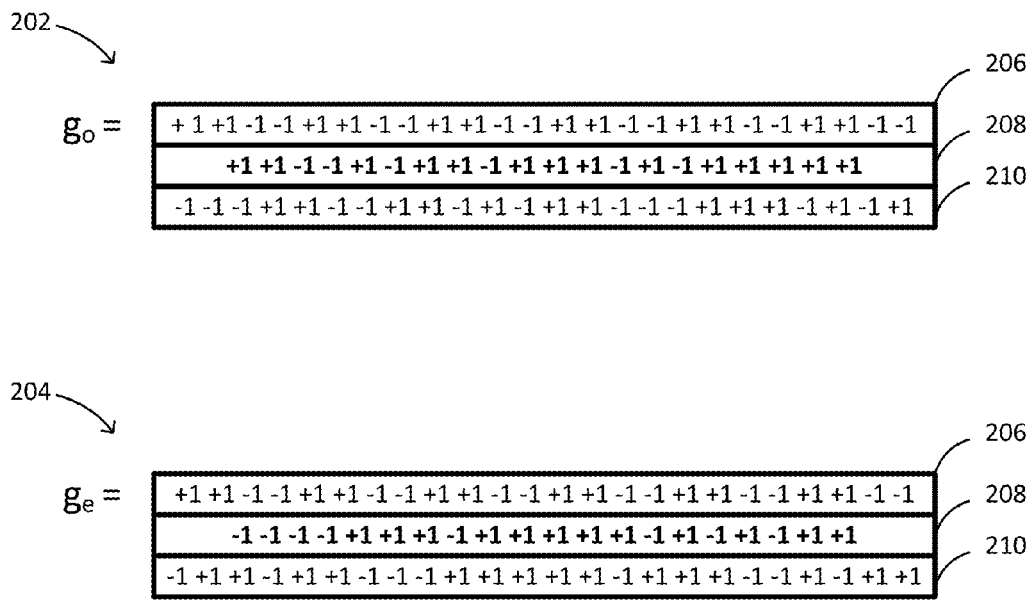
FIG. 4A shows exemplary data sequences of adjacent tracks from a first set of tracks and a second set of tracks, in accordance with an embodiment of the disclosure.
Figure 4B:
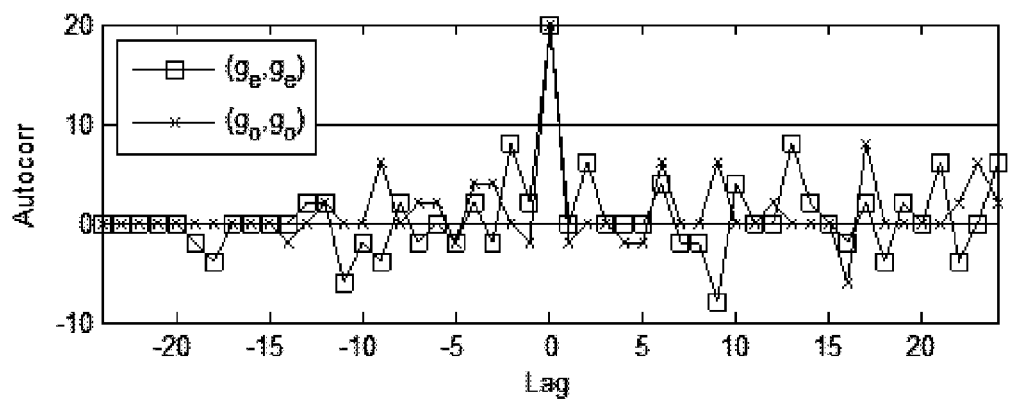
FIG. 4B shows autocorrelation plots for each of the exemplary data sequences, in accordance with an embodiment of the disclosure.
Figure 4C:
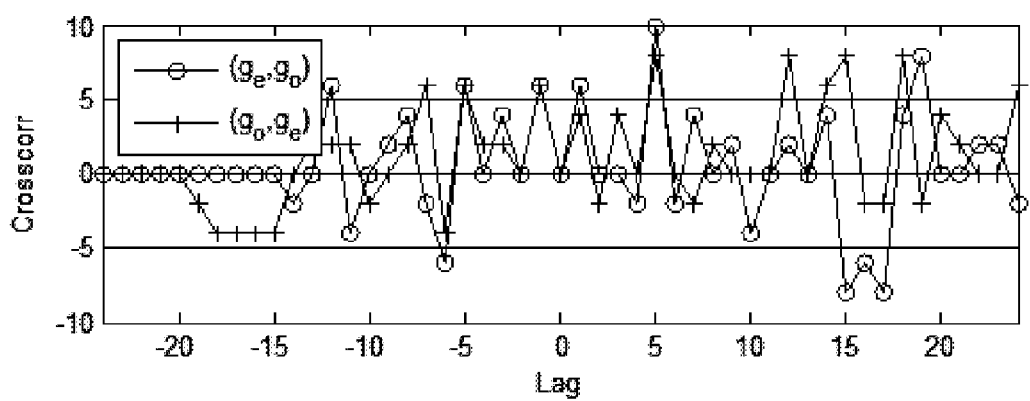
FIG. 4C shows cross-correlation plots for the exemplary data sequences including a plot for a first data sequence from the first set of tracks cross-correlated with a second data sequence from the second set of tracks and a plot for the second data sequence from the second set of tracks cross-correlated with the first data sequence from the first set of tracks, in accordance with an embodiment of the disclosure.

At step 302, the processor 102 searches a plurality of randomly generated pairs of sync patterns to identify one or more pairs of sync patterns where a first sync pattern and a second sync pattern of each pair exhibit delta-like autocorrelation and small cross-correlation. At step 304, the processor 102 compares the sync patterns with preamble portions 206 of the tracks 200 to further reduce the set of identified pairs to those where the sync patterns of each pair exhibit small cross-correlation with the preamble portions 206 of the tracks 200. In some embodiments, at steps 302 and 304, the autocorrelation and cross-correlation for data sequences representative of a first track 202 and a second track 204 are determined for a range of offsets or shifts, such as from $-(L+R)$ to $(L+R)$, where L is a length of the each syncmark and R is a number greater than or equal to zero. In some embodiments, $(L+R)$ is equal to the length of the preamble 206. FIG. 4A illustrates a first exemplary data sequence $g_o$ of a first (odd-numbered) track 202 and an exemplary data sequence $g_e$ of a second (even-numbered) track 204. FIGS. 4B and 4C depict autocorrelation and cross-correlation plots, respectively, for the exemplary data sequences over a range of phase offsets. As can be seen in FIG. 4B, each of the exemplary data sequences $g_o$ and $g_e$ exhibits a delta-like autocorrelation having a peak at the alignment origin. A plot of the cross-correlation between the exemplary data sequences $g_o$ and $g_e$ over the range of phase offsets can be seen in FIG. 4C. In some embodiments, the identified pairs of sync patterns maintain cross-correlation less than or equal to a threshold cross-correlation when shifted over the selected range of phase offsets.

In some embodiments, at steps 302 and 304, the identified pairs of sync patterns are further determined according to a preset or dynamically updated value representative of an absolute or aggregated correlation, where an absolute correlation $\gamma$ for a pair of data sequences $g_o$ and $g_e$ corresponding to pair of sync patterns is determined by the following:

$$\gamma = \Sigma_{k=0:2L+R,\neq L+R} |\Sigma_{n=1:L} g_e[n+k] g_e[n+L+R]| + \Sigma_{k=0:2L+R, \neq L+R} |\Sigma_{n=1:L} g_o[n+k] g_o[n+L+R]| + \Sigma_{k=0:2L+R} |\Sigma_{n=1:L} g_o[n+k] g_e[n+L+R]| + \Sigma_{k=0:2L+R} |\Sigma_{n=1:L} g_e[n+k] g_o[n+L+R]|$$

The pairs of sync patterns satisfying a threshold absolute correlation $\gamma_{min}$ (i.e. pairs having $\gamma \leq \gamma_{min}$) will generally exhibit small enough cross-correlation with shifts to be suitable for syncmark detection. Accordingly, these pairs are identified and saved as potential candidates for generation of the soft-orthogonal pair of syncmarks 208 for the first set of tracks 202 and the second set of tracks 204.

At step 306, the processor 102 selects a pair of sync patterns for generating the soft-orthogonal syncmarks 208 from identified pairs of sync patterns (i.e. the syncmark candidates). The selected pair is based upon a comparison between the sync patterns and user data portions 210 of the tracks 200. Although user data 210 is dynamic, small cross-correlation can be achieved by selecting sync patterns that are distinguishable on the basis of at least one data characteristic or pattern statistic of the user data portions 210 of the tracks 200 such as, but not limited to, run-length limited (RLL) constraint, a maximum transition run (MTR) constraint, a Markov property (e.g. bit transition rate), or any other pattern statistic that is substantially applicable to the user data portions 210 of the tracks 200. In some embodiments, the processor 102 selects a pair including a first sync pattern and a second sync pattern that would be prohibited by the data characteristic or are very unlikely according to the pattern statistic of the user data portions 210.

At step 308, the first sync pattern of the selected pair is used to generate syncmarks 208 for the first set of tracks 202 and the second sync pattern of the selected pair is used to generate syncmarks 208 for the second set of tracks 204 (e.g. a first syncmark for odd-numbered tracks and a second syncmarks for even-numbered tracks). The syncmarks 208 are soft-orthogonal in that they only exhibit small cross-correlation between each other and between preamble portions 206 of the tracks 200 (due to steps 302 and 304). Some pairs of syncmarks may provide similar values of $\gamma$; however, the selected pair of patterns that is used to generate the soft-orthogonal syncmarks exhibits little to no cross-correlation (i.e. a small $\gamma$ value) and also has small cross-correlation with user data portions 210 of the tracks 200 because the selected sync patterns include data sequences that are prohibited or unlikely to occur in the user data portions 210 of the tracks 200. Accordingly, the resulting syncmarks are detectable even in the presence of large phase offsets that result in interference from preamble or user data portions of neighboring tracks.

It should be recognized that the various functions, operations, or steps described throughout the present disclosure may be carried out by any combination of hardware, software, or firmware. In some embodiments, various steps or functions are carried out by one or more of the following: electronic circuits, logic gates, field programmable gate arrays, multiplexers, controllers, or computing systems. A computing system may include, but is not limited to, a personal computing system, mainframe computing system, workstation, image computer, parallel processor, or any other device known in the art. In general, the terms "controller" and "computing system" are broadly defined to encompass any device having one or more processors, which execute instructions from a carrier medium.

Program instructions implementing methods, such as those manifested by embodiments described herein, may be transmitted over or stored on carrier medium. The carrier medium may be a transmission medium, such as, but not limited to, a wire, cable, or wireless transmission link. The carrier medium may also include a non-transitory signal bearing medium or storage medium such as, but not limited to, a read-only memory, a random access memory, a magnetic or optical disk, a solid-state or flash memory device, or a magnetic tape.

It is further contemplated that any embodiment of the disclosure manifested above as a system or method may include at least a portion of any other embodiment described herein. Those having skill in the art will appreciate that there are various embodiments by which systems and methods described herein can be effected, and that the implementation will vary with the context in which an embodiment of the disclosure is deployed.

Furthermore, it is to be understood that the invention is defined by the appended claims. Although embodiments of this invention have been illustrated, it is apparent that various modifications may be made by those skilled in the art without departing from the scope and spirit of the disclosure.

What is claimed is:

1. A data storage system, comprising:
 a disk platter for storing at least a first set of tracks and a second set of tracks; and
 at least one processor in communication with the disk platter via at least one recording head, the at least one processor being configured to:
  identify one or more pairs of sync patterns, the one or more pairs of sync patterns being at least partially based upon an auto-correlation of a first sync pattern, an autocorrelation of a second sync pattern, and a cross-correlation between the first sync pattern and the second sync pattern;
  select a pair of sync patterns from the one or more pairs of sync patterns, the pair of sync patterns being at least partially based upon a cross-correlation between the first sync pattern and a track preamble of the second set of tracks, a cross-correlation between the second sync pattern and a track preamble of the first set of tracks, and a data characteristic of user data portions of the first set of tracks and the second set of tracks; and
  generate a first syncmark for the first set of tracks utilizing the first sync pattern and a second syncmark for the second set of tracks utilizing the second sync pattern.

2. The data storage system of claim 1, wherein the first set of tracks comprises odd numbered tracks and the second set of tracks comprises even numbered tracks.

3. The data storage system of claim 1, wherein each of the first sync pattern and the second sync pattern exhibits a delta-like autocorrelation.

4. The data storage system of claim 1, wherein the cross-correlation between the first sync pattern and the second sync pattern is below a threshold cross-correlation.

5. The data storage system of claim 1, wherein the cross-correlation between the first sync pattern and the track preamble of the second set of tracks is below a threshold cross-correlation, and wherein the cross-correlation between the second sync pattern and a track preamble of the first set of tracks is below the threshold cross-correlation.

6. The data storage system of claim 1, wherein the first sync pattern and the second sync pattern are distinguishable from the user data portions of the first set of tracks and the second set of tracks at least partially based upon the data characteristic of the user data portions of the first set of tracks and the second set of tracks.

7. The data storage system of claim 1, wherein the data characteristic comprises at least one of a run-length limited (RLL) property, a maximum transition run (MTR) property, and a bit transition rate.

8. The data storage system of claim 1, wherein the at least one recording head is configured for two-dimensional magnetic recording (TDMR).

9. The data storage system of claim 1, further comprising:
 a plurality of data storage devices configured as a redundant array of independent disks (RAID) storage cluster, wherein at least one data storage device of the plurality of data storage devices includes the disk platter and the at least one recording head.

10. A method of generating syncmarks for at least a first set of tracks and a second set of tracks being written to a non-transitory storage medium, comprising:
 identifying one or more pairs of sync patterns, the one or more pairs of sync patterns being at least partially based upon an auto-correlation of a first sync pattern, an auto-correlation of a second sync pattern, and a cross-correlation between the first sync pattern and the second sync pattern;
 selecting a pair of sync patterns from the one or more pairs of sync patterns, the pair of sync patterns being at least partially based upon a cross-correlation between the first sync pattern and a track preamble of the second set of tracks, a cross-correlation between the second sync pattern and a track preamble of the first set of tracks, and a data characteristic of user data portions of the first set of tracks and the second set of tracks; and
 generating a first syncmark for the first set of tracks utilizing the first sync pattern and a second syncmark for the second set of tracks utilizing the second sync pattern.

11. The method of claim 10, wherein the first set of tracks comprises odd numbered tracks and the second set of tracks comprises even numbered tracks.

12. The method of claim 10, wherein each of the first sync pattern and the second sync pattern exhibits a delta-like autocorrelation.

13. The method of claim 10, wherein the first sync pattern and the second sync pattern are distinguishable from the user data portions of the first set of tracks and the second set of tracks at least partially based upon the data characteristic of the user data portions of the first set of tracks and the second set of tracks.

14. The method of claim 10, wherein the data characteristic comprises at least one of a run-length limited (RLL) property, a maximum transition run (MTR) property, and a bit transition rate.

15. A non-transitory carrier medium bearing computer-readable instructions for generating syncmarks for at least a first set of tracks and a second set of tracks, the non-transitory carrier medium comprising computer-readable instructions for executing, via at least one processor, the steps of:
 identifying one or more pairs of sync patterns, the one or more pairs of sync patterns being at least partially based upon an auto-correlation of a first sync pattern, an auto-correlation of a second sync pattern, and a cross-correlation between the first sync pattern and the second sync pattern;
 selecting a pair of sync patterns from the one or more pairs of sync patterns, the pair of sync patterns being at least partially based upon a cross-correlation between the first sync pattern and a track preamble of the second set of tracks, a cross-correlation between the second sync pattern and a track preamble of the first set of tracks, and a data characteristic of user data portions of the first set of tracks and the second set of tracks; and
 generating a first syncmark for the first set of tracks utilizing the first sync pattern and a second syncmark for the second set of tracks utilizing the second sync pattern.

16. The non-transitory carrier medium of claim 15, wherein the first set of tracks comprises odd numbered tracks and the second set of tracks comprises even numbered tracks.

17. The non-transitory carrier medium of claim 15, wherein each of the first sync pattern and the second sync pattern exhibits a delta-like autocorrelation.

18. The non-transitory carrier medium of claim 15, wherein the first sync pattern and the second sync pattern are distinguishable from the user data portions of the first set of tracks and the second set of tracks at least partially based upon the data characteristic of the user data portions of the first set of tracks and the second set of tracks.

19. The non-transitory carrier medium of claim 15, wherein the data characteristic comprises at least one of a run-length limited (RLL) property, a maximum transition run (MTR) property, and a bit transition rate.

* * * * *